United States Patent

McLean et al.

[11] 3,975,492
[45] Aug. 17, 1976

[54] METHOD TO PRODUCE 3-DIMENSIONAL MATRIX SURFACE

[75] Inventors: Robert F. McLean, W. Bloomfield Township; Peter H. Hofer, Grosse Pointe Farms, both of Mich.

[73] Assignee: John Z. DeLorean Corporation, Bloomfield Hills, Mich.

[22] Filed: Aug. 21, 1975

[21] Appl. No.: 606,611

[52] U.S. Cl. ............................ 264/263; 264/137; 264/271; 264/279; 264/313; 264/337; 264/347
[51] Int. Cl.² .................. B29D 3/02; B29D 9/06; B29G 5/00
[58] Field of Search .......... 264/257, 263, 266, 271, 264/274, 279, 313, 321, 337, 338, DIG. 57, DIG. 66, 137, 316, 299, 347; 425/DIG. 44; 156/323, 176, 242

[56] References Cited
UNITED STATES PATENTS

| | | |
|---|---|---|
| 3,193,598 | 7/1965 | Schafer .......................... 264/321 |
| 3,566,650 | 3/1971 | Johnson .......................... 264/89 |

*Primary Examiner*—Willard E. Hoag
*Attorney, Agent, or Firm*—Reising, Ethington, Barnard, Perry & Brooks

[57] ABSTRACT

A method for molding a reinforced composite plastic structure to provide a roughened bondable surface over a portion thereof during the forming operation and which method includes molding a resin-filled, fiberglass-reinforced composite against a mold member having an elastomeric insert in the face thereof such that a portion of the fiberglass fibers are imbedded in the elastomeric member during molding so as to prevent encapsulation of the imbedded fibers by the resin and thereby leaving a roughened or three-dimensional surface over that area of the composite covered by the elastomeric mold inset.

5 Claims, 5 Drawing Figures

3,975,492

METHOD TO PRODUCE 3-DIMENSIONAL MATRIX SURFACE

BACKGROUND OF THE INVENTION

Field of the Invention

The present invention relates to the formation of reinforced plastic structures and particularly those made by adhering together preformed components or molding a form to one or more preformed components. It is very costly to make molds to form large reinforced plastic components and particularly those having compound curvatures. As an alternative to the costly process of one-part molding, it is possible to fabricate smaller components and thereafter adhere the same together. Another process for joining parts is known as co-molding wherein one or more parts are premolded and another part is directly molded thereto to form an integral structure. In either case, the use of greatly simplified mold shapes is possible by adhering or molding together of smaller components. However, a problem encountered in either co-molding or adhering preformed plastic components together is in providing satisfactory bond strength between the parts being joined since they normally involve very smooth surfaces which makes bonding difficult.

Accordingly, it is common practice to somehow roughen the surfaces being adhered together so that the cementing of adhering material can provide a strong mechanical connection between the parts. In the past this roughening has been achieved by sanding, etching, sand blasting, vapor honing, machining and other such post-molding processes.

The present invention relates to an improvement whereby during the formation or molding of the individual parts, a three-dimensional or rough bonding surface is concurrently provided. To properly understand the invention, it is first necessary to understand a typical reinforced composite material of which such parts may be formed. One such composite material in its simplest form includes an open-cell resilient foam layer which is overlayed with a layer of high strength filaments, such as fiberglass strands, and which foam layer is impregnated with a thermosetting resinous material, such as epoxy or polyester. The impregnated composite is then placed within a mold and compressed so that the resin fills substantially all of the open-cells of the foam layer and the excess resin is extruded therefrom so as to encapsulate the filament layer. Structures made by this type of process are shown in U.S. Pat. No. 3,193,441 Schafer and in copending application Ser. No. 519,496 Dirks, filed Oct. 31, 1974. Parts made by the aforedescribed method result in a resin matrix which extends throughout the composite and which matrix extends to the surfaces of the composite and normally provides a smooth finish. In view of such smooth finish it is difficult to satisfactorily bond together such components without providing an intermediate roughening operation. Applicants have developed a unique method whereby during the process by which such reinforced composite structures are formed, roughened portions are simultaneously provided which enables complementary parts to be bonded together without the necessity of such an intermediate roughing process.

SUMMARY OF THE INVENTION

It is thus the purpose of the present invention to provide a method for molding a reinforced structure having integrally formed therewith a roughened bondable surface over a portion thereof. The method comprises first forming a composite material which includes an open-cell resilient foam layer and at least one layer of high strength filaments which overlay the foam layer. The foam layer is impregnated with a thermosetting resinous material after which the composite is placed between a pair of mating mold members. The mold member against which the filament layer is placed includes an elastomeric insert which is normally disposed adjacent a portion of the composite material. When the molds are moved together, the foam layer is compressed and the adjacent filaments thereby imbedded in the elastomeric member. So long as the filaments are thus imbedded in the elastomeric material, they are masked or covered to prevent their being completely encapsulated by the thermosetting resin material which is otherwise being extruded from the foam layer to encapsulate the unimbedded filaments. While maintaining the compressive force on the composite material, the resinous material is heat cured so as to provide a hardened resin matrix extending throughout the composite and forming smooth outer surfaces of skins except for that part of the composite wherein the filaments have been imbedded in the elastomeric portion of the mold member. After such curing, the molds are opened and the rigidified structure removed from the molds whereby the previously imbedded filaments project above the cured resin matrix to provide a roughened and readily bondable surface area.

A detailed description of the apparatus whereby the invention is performed as well as the materials used in practicing the invention will be hereinafter set forth in greater detail.

Figure 1:
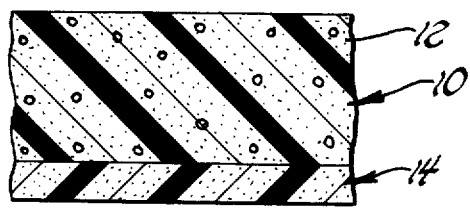
FIG. 1 is a sectional view of a composite material utilizable with the subject invention.

Referring to FIG. 1, an unformed and uncured composite material is indicated generally at 10 and is of a type and construction utilizable with the present invention. Composite material 10 includes a first layer 12 of an initially resilient open-cell foam material such as polyurethane. In referring to the open-cell character of foam material 12 is meant the condition wherein the cells are generally in open communication with each other. The open-cell character of the foam layer enables the latter to function as a reservoir for an uncured thermosetting resin the purpose of which will become apparent as the invention is described in greater detail.

Composite material 10 also includes a layer of high strength reinforcing filaments 14 overlaying at least one side of foam layer 12. The filaments of high strength layer 14 may be of any suitable material such as a mat of fiberglass fibers. Particularly as described in copending application Ser. No. 519,496 Dirks, it is possible to use multiple layers of foam material and high strength filaments depending on the ultimate physical characteristics desired for the formed composite structure. For purposes of illustrating the present invention, the simplest combination of one foam layer and one filament layer is utilized.

Figure 2:
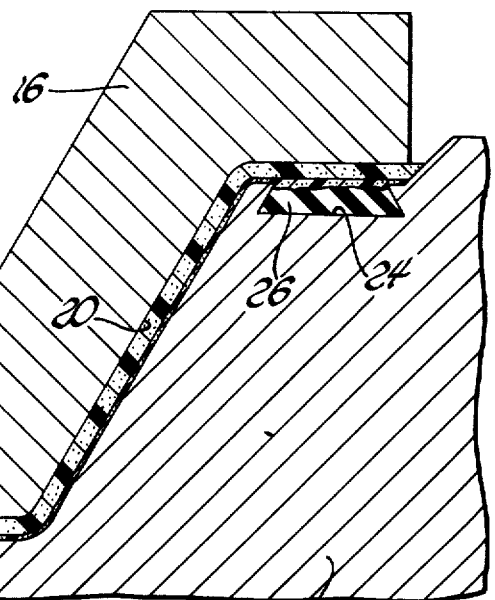
FIG. 2 is a sectional view through coacting mold members with an interposed composite material.

Referring now to FIG. 2, male and female mold members are indicated respectively at 16 and 18. The coacting mold faces 20 and 22 of mold members 16 and 18 are formed and normally highly polished to yield the desired composite structure shape and surface finish. The general method of forming such a composite structure comprises separating the mold members so as to permit laying of the uncured composite material 10 upon one of the mold members such that the high strength reinforcing layer 14 abuts against one of the mold faces such as 22. The open-cell foam layer 12 is impregnated with an uncured thermosetting resin, such as polyester or epoxy, while in the mold or, more preferably, impregnated with such resin prior to insertion into the mold. With the resin carrying composite material 10 now suitably covering one of the mold members, such as 18, the upper or male mold member 16 is now brought into coacting position on top of composite material 10. A suitable mold pressure is now applied which results in a substantial reduction, e.g. 75%, in the thickness of the foam layer thereby causing the uncured resin to fill substantially all of the cells of the foam layer and extruding excess resin toward the mold faces 20 and 22 and to thereby encapsulate most of the high strength filament layer 14. While maintaining such pressure on the composite, heat is now applied to cure the resin which results in a high strength composite structure having a resin matrix extending throughout the structure and encapsulating the reinforcing layer 14.

In thus forming the composite structure, the outer surfaces thereof are very smooth. The hard, smooth skin is highly desirable in the finished product except to the extent that two or more of such structures are to be bonded together to make a large unitary end product and, in which case, the smooth surfaces make bonding very difficult.

In order to provide what may be termed a three dimensional or roughened surface on a portion of the finished product during the molding operation, means is provided to mask or cover a portion of high strength filament layer to prevent the same from being completely encapsulated during the molding process. To this end, and referring particularly to FIGS. 2 and 3, mold member 18 is provided with a recess 24 into which is molded or otherwise inserted an elastomeric member 26. Elastomeric member 26 is soft, deformable and made of a material which does not adhere to the resin during the molding operation. In other words, the material should have good release qualities and such qualities are meant by the word "releasable" as used hereinafter. The elastomeric material also must be able to withstand the temperatures utilized to cure the thermosetting resin. A highly suitable elastomeric material for the purpose of this invention is a room temperature vulcanizable silicone. In utilizing such a silicone material, it is possible to avoid the necessity of using more typical mold release materials which themselves must be removed from the molded parts after forming through the use of expensive and/or dangerous solvents.

Figure 3:
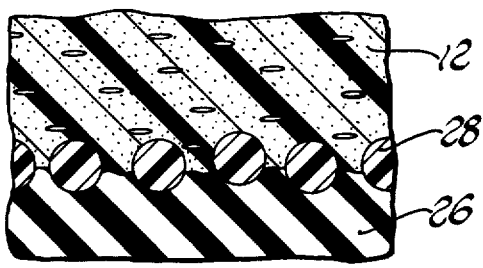
FIG. 3 is an enlarged section from FIG. 2 showing high strength fibers imbedded in an elastomeric portion of the mold.

To better understand the functioning of the elastomeric mold material 26 in masking or partially masking the high strength filament layer 14 during the molding operation, reference should be made to the enlarged sectional view of FIG. 3. In this figure the composite material in its compressed state between the mold members 16 and 18 particularly illustrates the masking relationship between the high strength filaments 28 and elastomeric mold material 26. With the composite material under compression whereby foam layer 12 is substantially reduced in thickness, those high strength filaments 28 adjacent the elastomeric material 26 become partially imbedded in the latter. Those portions of the high strength filaments thus imbedded within the elastomeric material are masked or covered and therefore prevented from being encapsulated by the thermosetting resin as it is extruded out of the foam layer. To be more precise, those portions of the filaments adjacent the foam layer and imbedded therein during the compressive step are encapsulated by the resin while those portions of the same filaments imbedded in the elastomeric material are not so encapsulated.

Thus, upon separating of the mold members 16 and 18 and removal of he cured reinforced composite material, an area 30 of the finished part 32 or 34 corresponding in size to that of the elastomeric material has an unencapsulated or three dimensional surface comprised of the projecting filaments 28. It is this three dimensional or roughened surface which now provides the area 30 on the composite part which can have a suitable cementing material applied thereto for bonding to similarly formed companion parts 32 and 34 as seen in FIGS. 4 and 5.

It is to be understood that in referring to the filaments 28 as being unencapsulated or partially encapsulated means that the cured thermosetting resin does not substantially fill all the voids in the outer surface of reinforcing filament layer 14 and does leave the filaments masked by elastomeric material 26 projecting above the cured resin matrix. It is possible that even the masked filaments may have a thin film of cured resin over their outer surfaces. Such a thin film does not, however, disturb the three dimensional or roughened character of the masked area 30.

Figure 4:
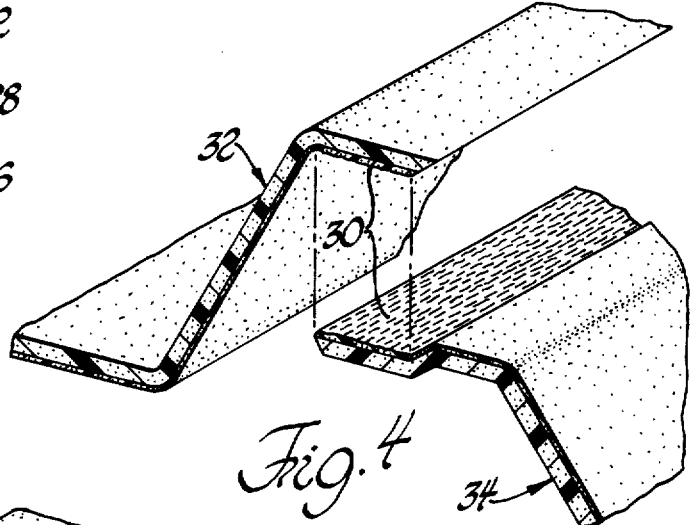
FIGS. 4 and 5 show rigidified molded parts being co-molded.
Figure 5:
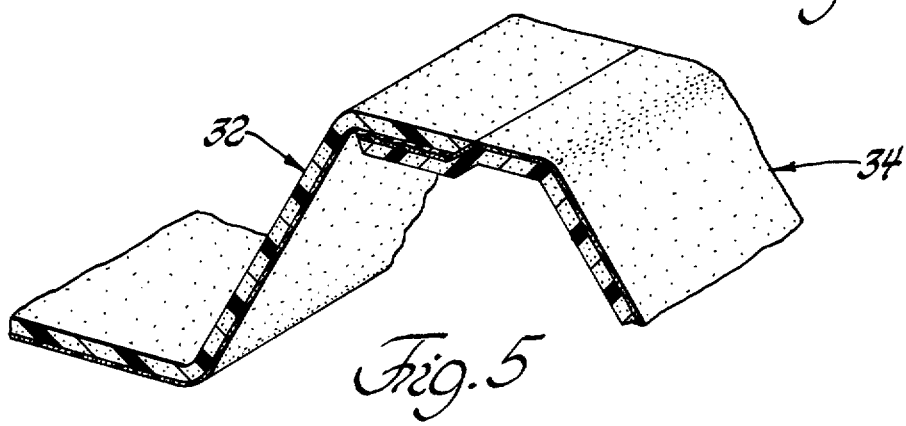

More specific reference is now made to FIGS. 4 and 5 of the drawings which show a pair of reinforced composite parts 32 and 34 made in accordance with the invention and indicating the manner in which such parts may be joined to provide a larger unitary part as depicted in FIG. 5. Parts 32 and 34 are suitably molded in accordance with the present invention to provide bonding surfaces 30 proximate their outer edges. Further, after parts 32 and 34 are joined as shown in FIG. 5, the roughened bonding surfaces 30 are covered leaving smooth exposed surfaces on the finished larger part.

EXAMPLE:

A 4 mm. (0.158 inch) thick ERM plaque 8 inch × 10 inch square was bonded to another 4 mm. (0.158 inch) thick plaque; the bonded area was an overlap of one inch. Specific gravity of the plaques was 1.3 inches and 1.29 inches respectively. Molding pressure 78 psi, molding temperature 200°F., resin system filled 828 epoxy with adducted safety hardener (18/118 ratio), polymerization time 10 minutes.

When bonded without practicing the invention, i.e. molding against chrome plated steel and cleaning the to-be-comolded 1 inch overlap via solvent/wipe with Methylene Chloride, the lap shear strength was 214 pounds/linear inch.

Molding the first plaque overlap area (1 inch) against 0.085 inch thick Silicone rubber (RTV) and the second plaque against this (1 inch) 3-dimensional surface, the lap shear strength increased to 817 pounds/linear inch. No solvent/wipe was used in the latter method.

What is claimed is:

1. A method for molding a reinforced structure to provide a roughened bondable surface over a portion thereof, said method comprising laying up a composite material including a preformed open-cell resilient foam layer and an adjacent layer of high strength filaments, impregnating the foam layer with a thermosetting resinous material, placing said composite material between a pair of mating mold members one of said members engaging the layer of filaments, providing the mold member engaging the filament layer with an a soft and deformable elastomeric mold portion said elastomeric portion being releasable from said resinous material, closing said mold members to compress the foam layer and partly imbed adjacent filaments in the elastomeric portion, maintaining sufficient molding pressure to extrude excess resinous material from the foam layer to at least partly encapsulate the unimbedded portions of filaments, heat curing the resinous material while maintaining said molding pressure to provide a cured resin matrix, and thereafter opening the mold members to remove the rigidified structure therefrom whereby the partly imbedded filaments project above the cured resin matrix.

2. A method for molding a reinforced structure to provide a roughened bondable surface over a portion thereof, said method comprising laying up a composite material including a preformed open-cell resilient foam layer and an adjacent layer of high strength filaments, impregnating the foam layer with a thermosetting resinous material, placing said composite material between a pair of mating mold members one of said members engaging the layer of filaments, providing the mold member engaging the filament layer with a soft, deformable and releaseable elastomeric member adjacent a portion of the filament layer, closing said mold members to compress the foam layer and partly imbed adjacent filaments in the elastomeric surface, maintaining sufficient molding pressure to fill substantially all the initially open foam cells and to extrude excess resinous material from the foam layer to at least partly encapsulate and fill the voids between the unimbedded filaments, heat curing the resinous material while maintaining said molding pressure to provide a cured resin matrix, and thereafter opening the mold members to remove the rigidified structure therefrom whereby the partly imbedded filaments project above the cured resin matrix.

3. A method for molding a reinforced structure to provide a roughened bondable surface over a portion thereof, said method comprising laying up a composite material including a preformed open-cell resilient foam layer and an adjacent layer of high strength filaments, impregnating the foam layer with a thermosetting resinous material, placing said composite material filament layer against a mold surface which includes a soft, deformable and releasable elastomeric portion adjacent a portion of the filament layer, applying a compressive force to substantially reduce the thickness of the foam layer and to partly imbed adjacent filaments in the elastomeric portion of the mold surface, maintaining sufficient compressive force to extrude excess resinous material from the compressed foam layer to at least partly encapsulate the unimbedded filaments, heat curing the resinous material while maintaining said compressive force to provide a cured resin matrix, and thereafter removing the rigidified structure from the mold surface whereby the partly imbedded filaments project above the cured resin matrix.

4. A method for molding a reinforced structure to provide a roughened bondable surface over a portion thereof, said method comprising placing a layer of high strength filaments against a mold surface which includes a soft, deformable and releaseable elastomeric insert, overlaying the filament layer with a preformed initially resilient open-cell foam layer, impregnating the foam layer with a thermosetting resinous material, applying a compressive force to substantially reduce the thickness of the foam layer and partly imbed adjacent filaments into the elastomeric insert, maintaining sufficient compressive force to extrude excess resinous material from the compressed foam layer to at least partly encapsulate the partly filaments, heat curing the resinous material while maintaining said compressive force to provide a hardened resin matrix, and thereafter removing the rigidified structure from the mold surface whereby the partly imbedded filaments project above the hardened resin matrix.

5. A method for molding a reinforced structure between a pair of relatively movable members having hardened and smooth coacting mold surfaces and one of which surfaces includes a soft, deformable and releasable elastomeric insert, said method comprising placing a layer of high strength filaments against the mold surface having the elastomeric insert, overlaying the filament layer with a preformed initially resilient open-cell foam layer, impregnating the foam layer with a thermosetting resinous material, actuating the mold members to compress the foam layer and partly imbed adjacent filaments in the elastomeric insert, maintaining sufficient molding pressure to extrude excess resinous material from the foam layer to at least partly encapsulate the unimbedded filaments, heat curing the resinous material while partly maintaining said molding pressure to provide a cured resin matrix, and thereafter opening the mold members to remove the rigidified structure therefrom whereby the partly imbedded filaments project above the cured resin matrix to provide a roughened bondable surface.

* * * * *